United States Patent [19]

Rinderer

[11] Patent Number: 4,967,990
[45] Date of Patent: Nov. 6, 1990

[54] SUPPORT FOR AN ELECTRICAL BOX

[75] Inventor: Eric R. Rinderer, Highland, Ill.

[73] Assignee: B-Line Systems, Inc., Highland, Ill.

[21] Appl. No.: 441,884

[22] Filed: Nov. 27, 1989

Related U.S. Application Data

[63] Continuation of Ser. No. 302,792, Jan. 26, 1989, abandoned.

[51] Int. Cl.$^5$ .............................................. E04G 3/00
[52] U.S. Cl. .................................. 248/205.1; 248/909;
248/906; 248/546; 248/218.4; 220/3.9
[58] Field of Search ................. 248/205.1, 218.4, 546,
248/343, 27.1, 909, 906, 57; 174/63; 220/3.5,
3.9

[56] References Cited

U.S. PATENT DOCUMENTS

| 1,156,885 | 10/1915 | Caine | 248/DIG. 6 X |
|---|---|---|---|
| 1,464,620 | 8/1923 | Tefft | 248/DIG. 6 X |
| 1,786,353 | 12/1930 | Logan | 174/63 |
| 1,850,616 | 3/1932 | Barnett | 248/DIG. 6 X |
| 1,961,728 | 6/1934 | Arnest et al. | 248/DIG. 6 X |
| 2,316,389 | 4/1943 | Atkinson | 248/DIG. 6 X |
| 2,670,919 | 3/1954 | Esoldi | 248/27.1 |
| 2,962,252 | 11/1960 | Frank | 248/DIG. 6 X |
| 3,104,087 | 9/1963 | Budnick et al. | 248/57 X |
| 3,536,287 | 10/1970 | Kramer | 248/DIG. 9 X |
| 4,757,967 | 7/1988 | Delmore et al. | 248/DIG. 6 |
| 4,790,505 | 12/1988 | Rose | 248/205.1 |

Primary Examiner—Karen J. Chotkowski
Attorney, Agent, or Firm—Senniger, Powers, Leavitt and Roedel

[57] ABSTRACT

A support for an electrical box, comprising a bar to be mounted between two spaced-apart wall studs or the like. The bar comprises an elongate web of sheet metal forming a front face of the bar and having side edges extending lengthwise of the bar, a pair of flanges extending rearwardly from the side edges of the web, and a forwardly-opening channel formed in the web running substantially the full length of the web between the side edges of the web. The channel has spaced apart side walls extending rearwardly from the front face of the web, a bottom wall connecting the side walls and forming the bottom of the channel, and pilot holes spaced along the bottom wall of the channel at relatively closely spaced and regular intervals whereby an electrical box may be attached to the bar in a selected position lengthwise of the bar by placing the back wall of the box flush against the front face of the web over the channel and then fastening the box to the bar by using fasteners threaded through selected pilot holes in the bottom wall of the channel.

17 Claims, 3 Drawing Sheets

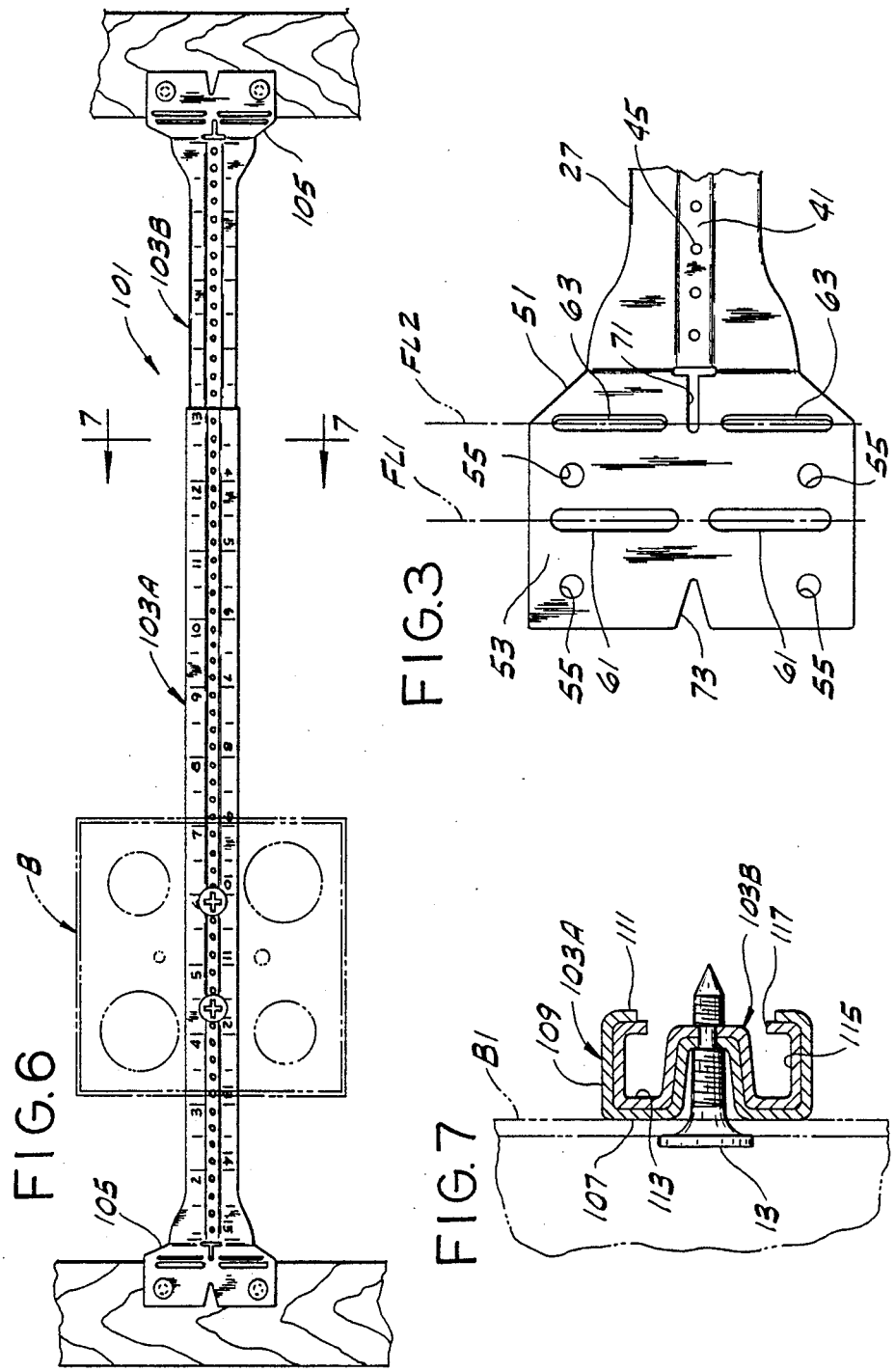

SUPPORT FOR AN ELECTRICAL BOX

This is a continuation of application Ser. No. 07/302,792, filed Jan. 26, 1989 and now abandoned.

BACKGROUND OF THE INVENTION

This invention relates generally to devices for supporting electrical boxes and, more particularly, to an improved device for mounting electrical boxes in a selected position between two generally parallel wall studs or the like.

In the building construction industry, various devices have been used to mount electrical boxes in fixed position relative to structural members, including such devices as shown in U.S. Pat. Nos. 1,056,759, 1,156,885, 1,550,327, 1,800,813, 2,963,253, 3,425,655, 3,518,421, 3,528,636 and 4,757,967. However, these devices have drawbacks. For example, some are overly complicated and thus difficult to handle and use. Others require the use of power tools to attach an electrical box to the device. Still others cannot accommodate electrical boxes of different depths. Accordingly, there is a need in the industry for an improved support for an electrical box.

SUMMARY OF THE INVENTION

Among the several objects of this invention may be noted the provision of an improved electrical box support which may be readily fastened to wall studs; the provision of such a support which has good beam strength characteristics; the provision of such a support which allows for an electrical box to be installed at any location lengthwise of the support; the provision of such a support which has pre-formed pilot holes for enabling an electrical box to be quickly fastened to the support either manually or by using a power tool; the provision of such a support which may be quickly modified to accommodate electrical boxes of different depths; the provision of such a support which is relatively narrow so as not to block useage of the knockouts in the rear wall of an electrical box; the provision of such a support which has graduations thereon for enabling one or more electrical boxes to be placed at precise locations or the support relative to one another and to the wall studs; the provision of such a support which provides for automatic alignment of each box and the bar; the provision of such a support which minimizes stripping of screw threads when an electrical box is fastened to the support by threaded fasteners; and the provision of such a support which is simple in design for economical manufacture.

Generally, an electrical box support of this invention comprises a bar adapted to be mounted between two spaced-apart wall studs or the like. The bar comprises an elongate web of sheet metal forming a front face of the bar and having side edges extending lengthwise of the bar, a pair of flanges extending rearwardly from the side edges of the web, and a forwardly-opening channel formed in the web running substantially the full length of the web between the side edges of the web. The channel has spaced apart side walls extending rearwardly from the front face of the web, a bottom wall connecting the side walls and forming the bottom of the channel, and pilot holes spaced along the bottom wall of the channel at relatively closely spaced and regular intervals whereby an electrical box may be attached to the bar in a selected position lengthwise of the bar by placing the back wall of the box flush against the front face of the web over the channel and then fastening the box to the bar by using fasteners threaded through selected pilot holes in the bottom wall of the channel.

In a second aspect of this invention, the support comprises a bar adapted to be mounted between two spaced-apart wall studs or the like. The bar comprises an elongate web of sheet metal forming the front face of the bar and having opposite side edges extending lengthwise of the bar, a forwardly-opening channel formed in the web running substantially the full length of the web between the side edges of the web, and elongate extensions of the bar projecting generally forwardly from the web at opposite ends of the bar and having free outer end portions bent to form fastening flaps extending laterally outwardly away from one another and generally parallel to the web of the bar. The flaps are adapted for engagement with the vertical studs and securement thereto by fasteners, each extension having means spaced inwardly from its free outer end defining a first fold line extending generally transversely of the extension and means spaced inwardly from the first fold line defining a second fold line extending generally transversely of the extension. If a relatively deep electrical box is to be attached to the bar, the extensions are adapted to be bent at the first fold lines to form the fastening flaps, and if a shallower electrical box is to be attached to the bar, the extensions are adapted to be bent at the second fold lines to form said fastening flaps. The electrical box is adapted to be attached to the bar in a selected position lengthwise of the bar by placing the back wall of the box flush against the front face of the web other the channel and then fastening the box to the bar by using fasteners threaded into said channel.

Other objects and features will be in part apparent and in part pointed out hereinafter.

BRIEF DESCRIPTION OF THE DRAWINGS

FIG. 3 is an enlarged view of FIG. 1 showing an end extension the support with two pairs of slots defining a pair of parallel fold lines;

FIG. 6 is a view of a support comprising telescoping bars to enable lengthwise adjustment of the support; and FIG. 7 is an enlarged vertical section taken on line 7—7 of FIG. 6.

Corresponding parts are designated by corresponding numerals throughout the several views of the drawings.

DESCRIPTION OF THE PREFERRED EMBODIMENT

Figure 1:
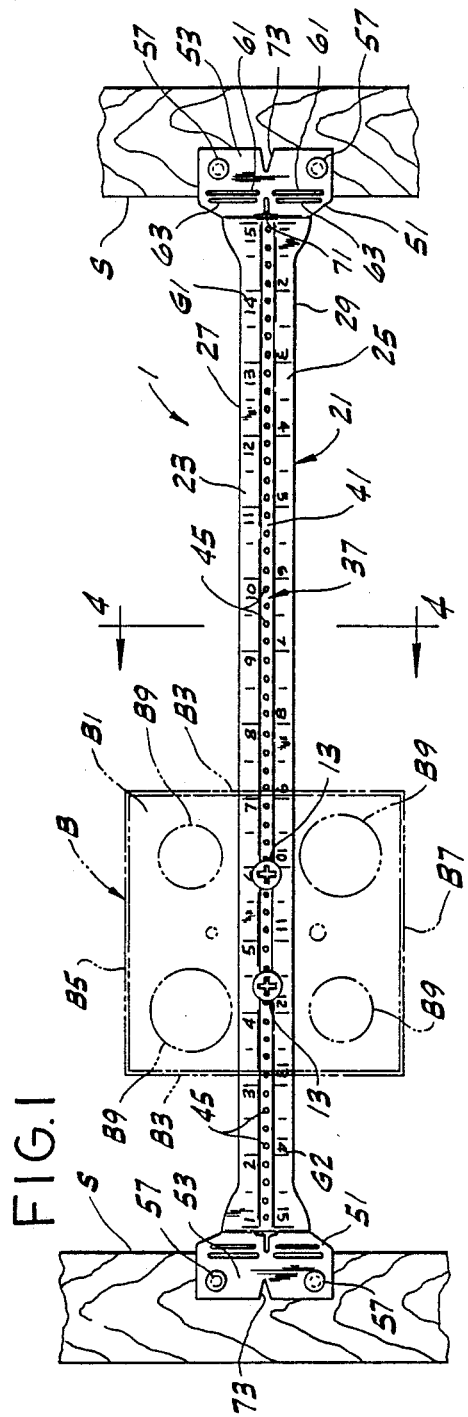
FIG. 1 is an elevational view of a support of this invention fastened to two wall studs, and an electrical box mounted on the support.
Figure 2:
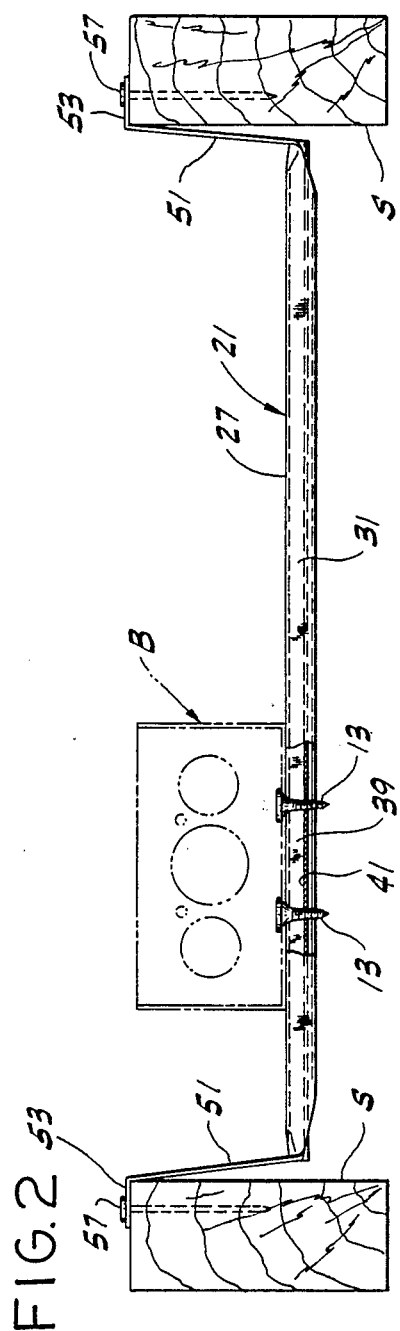
FIG. 2 is a plan view of FIG. 1.

Referring now to the drawings, and first more particularly to FIGS. 1 and 2, there is generally indicated at 1 a support of the present invention for mounting an electrical box generally indicated at B between two spaced-apart generally vertical wall studs, each designated S, which may conventional wood or metal studs. The electrical box is of traditional design, having a back wall B1, side walls B3, and top and bottom walls B5 and B7, respectively. The back wall B1 is formed with a series of circular knockout portions B9 which may be removed to Permit passage of electrical conduit in conventional fashion. The back wall of the box also has a series of openings (not shown) therein for enabling the box to be secured in position by suitable fasteners 13, as will become apparent.

The hanger 1 comprises a bar generally indicated at 21 adapted to be mounted in generally a horizontal position between the two wall studs S. The bar comprises an elongate web 23 of sheet metal (20-ga. galvanized sheet steel, for example) forming the front face 25 of the bar lying in a generally vertical plane when the bar is mounted in its usual orientation, as shown in FIG. 1. The web 23 has a pair of generally parallel side edges, one of which constitutes the upper edge 27 of the web and the other of which constitutes the lower edge 29 of the web. A pair of integral flanges 31 extend generally horizontally rearwardly (to the right as viewed in FIG. 4) from respective upper and lower edges 27, 29 of the web. These flanges 31 have rearward end Portions bent to form a pair of relatively short lips, each designated 33, extending generally at right angles to the flanges inwardly toward one another. These lips increase the beam strength of the bar in front-to-rear direction, which is the direction of greatest force applied to the bar during and after attachment of an electrical box B to the bar. It is understood that the lips 33 can be eliminated from the bar without departing from the scoPe of this invention.

The web 23 is fabricated to have a forwardly-opening generally horizontal channel, generally designated 37, running substantially the full length of the web approximately midway between its upper and lower edges 27, 29. The channel 37 is a relatively narrow flat-bottom generally U-shaped channel, comprising a pair spaced apart side walls 39 extending generally rearwardly from the front face 25 of the web, and a generally planar vertical bottom wall 41 connecting the side walls and forming the bottom of the channel. The side walls 39, which also increase the strength of the bar in front-to-rear direction, taper inwardly (at about a 5° angle) toward one another in the rearward direction to provide the necessary clearance for screw fansteners 13.

Figure 4:
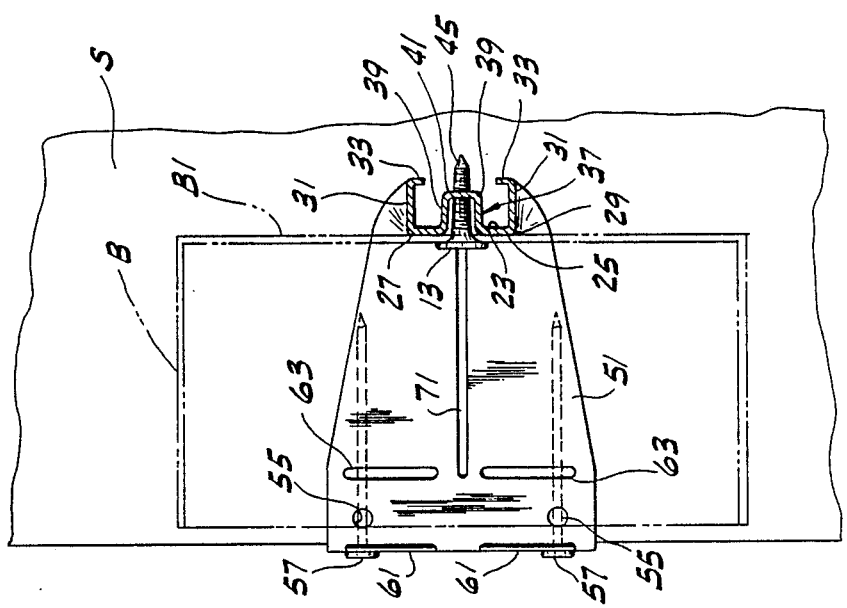
FIG. 4 is a vertical section taken on line 4—4 of FIG. 1 showing the support as used to mount a relatively deep electrical box.

In accordance with this invention, pilot holes 45 are spaced along the bottom wall 41 of the channel 37 at closely spaced and regular intervals (e.g., every ¼ in.) whereby an electrical box (such as the one indicated at B in the drawings) can be attached to the bar 21 in a selected position lengthwise f the bar by placing the back wall B1 of the box flush against the front face 25 of the web 23 of the bar over the channel 37 and then fastening the box to the bar by using screw fasteners 13 threaded through selected pilot holes 45 in the bottom wall of the channel, as shown in FIGS. 2 and 4. Because the row of pilot holes 45 is centered between and parallel with the upper edge 27 and lower edge 29 it insures that all fasteners 13 are inserted on the centerline of the bar. This further insures that all electrical boxes B are quickly and effortlessly affixed to the bar in proper orientation and alignment. When the fastener openings in the electrical box B are substantially larger in diameter than the shank of the fasteners 13, the screw fasteners 13 are preferably "bugle-head" screw fasteners, meaning that the screw heads are generally conical in shape, so that the screws are self-centering with respect to the fastener openings in the back wall of the electrical box to ensure that the box is mounted square on the bar.

It will be noted that the bar 21 is sufficiently narrow (no greater than about ¾ inches) that it does not block any of the four knockout portions B9 in the back wall of the box (see FIG. 1), the result being that the bar does not interfere with the useage of these knockout portions.

As best illustrated in FIG. 1, the front face 25 of the web 23 of the bar 21 has two sets of graduations thereon at spacings preferably corresponding to inches and fractions thereof, so that an electrical box maY be mounted in a precise position relative to the bar, or so that a series of boxes may be mounted in the same location on different bars. A first set cf graduations, designated G1, is provided between the channel 37 and the upper edge 27 of the web and is oriented to be read when the bar is mounted as shown in FIG. 1. A second set, designated G2, is Provided between the channel and the lower edge 29 of the web and is oriented to be read when the bar is mounted with side edge 29 facing uPwardly. Thus, the appropriate set of graduations may be conveniently used regardless of which side edge 27, 29 is facing up when the bar 21 is mounted on the studs S. Preferably, the graduations G1, G2 on the bar are so positioned relative to the pilot holes 45 in the channel bottom 41 that when a side wall B3 of the electrical box is aligned with a graduation, at least two pilot holes are in register with two of the fastener openings in the back wall of the box to ensure ease of installation of the box on the bar.

The bar is attached to studs S by a pair of integral elongate extensions 51 of the bar 21 projecting generally forwardly from the web at opposite ends of the bar (see FIG. 2). The extensions have free outer end portions bent to form fastening flaps, each designated 53, extending laterally outwardly away from one another and generally parallel to the web of the bar for engagement with faces of the vertical wall studs S. Each flap has openings 55 therein for receiving fasteners 57 to fasten the support to the studs.

Figure 5:
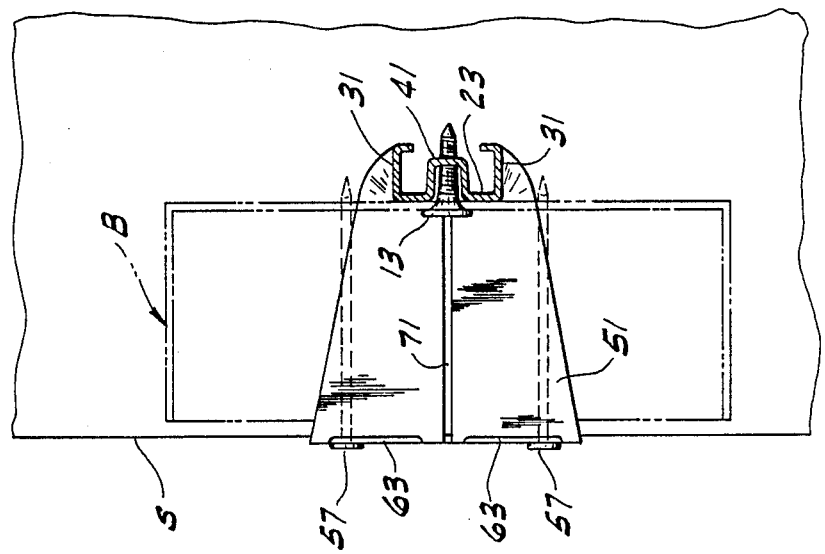
FIG. 5 is a view similar to FIG. 4 showing the support as used to mount a shallower electrical box.

As shown best in FIG. 3, each extension 51 has means comprising a first pair of slots 61 (constituting slot means) spaced inwardly from its free outer end defining a first fold line FL1 extending generally transversely of the extension and means comprising a second pair of slots 63 (constituting slot means) spaced inwardly from the first fold line FL1 and defining a second fold line FL2 extending generally transversly of the extension and generally parallel to the first fold line FL1. The arrangement is such that the support 1 of the present invention may accommodate electrical boxes of two different depths e g., 1½ in. deep and 2⅜ in. deep boxes). Thus, if a relatively deep box B is to be attached to the bar, as shown in FIG. 4, the extensions 51 are bent at the first fold lines FL1 to form the fastening flaps 53. If, on the other hand, a shallower box is to be attached to'the bar, as shown in FIG. 5, the extensions 51 are bent at the second fold lines FL2 to form the fastening flaps 53. It will be noted in this regard that the fold lines are so located that when the fastening flaps 53 are formed according to the depth of electrical box to be attached to the bar, the distance between the front face 25 of the bar and the plane of the fastening flaps generally corresponds to the depth of the box so that, when the box is attached to the bar, the front of the box lies generally in the plane of the flaps for mounting of the box in proper front-to-rear direction with respect to the wall studs S.

It will be observed that a slot 71 extends from the bottom 41 of channel 37 up to approximately the first fold line FL1 of each extension 51. This slot 71 is the result of the process (e.g., a progressive die stamping operation) by which the support is formed and has no functional purpose in the use of the support. The fastening flaps 53 have V-notches 73 therein extending inwardly from their outer edges in line with the central longitudinal axis of the bar 21. These notches 73 enable the bar to be lined up with markings on the studs S indicating the height at which the support 1 is to be mounted.

FIGS. 6 and 7 illustrate a support 101 of the present invention modified to provide lengthwise of adjustment of the support for accommodating different stud spacings (e g., 14-24 in. spacing). As shown, this support comprises two telescoping bars designated 103A and 103B, each bar being identical in shape to the bar 21 previously described except that each has an extension 105 only at one end so that when the bars are telescopically interfitted they combine to form a complete support which is adjustable in length. One of the bars (103B) is slightly smaller in cross section than the other bar (103A) so as to telescopically fit inside the other bar with the web 107, flanges 109 and lips 111 of one bar being in engagement with the web 113, flanges 115 and lips 117, respectively, of the other bar, as shown in FIG. 7. It will be noted in this regard that the engagement of the lips 111, 117 of the two bars maintains the two bars together and makes them self-supporting without the need for fasteners.

In use, the support 1 or 101 of the present invention is quickly and easily installed by bending the extensions 51, 105 of the bar along the appropriate fold lines FL1 or FL2 according to the depth of electrical box to be mounted. The fastening flaps 53 thus formed are then fastened by suitable fasteners 57 to the wall studs to secure the bar in a generally horizontal position extending between the studs. Using the upper set of graduations (e.g., G1), the electrical box is then placed in precise position on the bar with the back wall B1 of the box flush against the front face 25 of the bar. The box is attached to the bar by inserting suitable screw fasteners 13 (preferably "bugle-head" screws) through fastener openings in the back wall of the box and then threading the fasteners through pilot holes 45 in register with the fastener openings. This may be done manually by using a screw driver or automatically by using a power tool. In either case, the pilot holes facilitate and expedite driving the screws. Moreover, because the channel is U-shaped (rather than V-shaped), the threads of the screw fasteners are able engage the full thickness of the channel bottom 41 to prevent stripping of the metal. The taper of the channel side walls 39 provides clearance for the screws as they are threaded through the channel bottom.

It will be understood that more than one electrical box can be mounted on a support of the present invention, in which case the graduations (G1 or G2) allow the boxes to be located at precise spacings without the use of a ruler or tape measure.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A support for an electrical box, comprising a bar adapted to be mounted between two spaced-apart wall studs or the like, said bar comprising an elongate web of sheet material forming a front face of the bar and having side edges extending lengthwise of the bar, a pair of flanges extending generally rearwardly from the side edges of the web, a forwardly-opening, generally U-shaped channel formed in the web running substantially the full length of the web between the side edges of the web, said generally U-shaped channel having spaced apart side walls extending generally rearwardly from the front face of the web, a bottom wall connecting the side walls and forming the bottom of the channel, and a plurality of preformed pilot holes spaced along the bottom wall of the channel at relatively closely spaced and regular intervals whereby an electrical box may be attached to the bar in a selected position lengthwise of the bar by placing the back wall of the box flush against the front face of the web over the channel and then fastening the box to the bar by using fasteners threaded through selected pilot holes in the bottom wall of the channel.

2. A support as set forth in claim 1 wherein said flanges have rearward end portions bent to form a pair of lips extending generally parallel to said web.

3. A support as set forth in claim 1 wherein said lips are bent inwardly toward the side walls of the channel.

4. A support as set forth in claim 3 comprising a pair of said bars adapted for a telescopic fit with one another to provide lengthwise adjustment of the support, one of said bars being slightly smaller in cross section than the other so as to telescopically fit inside the other bar with the web, flanges and liPs of one bar being generally in engagement with the web, flanges and lips, respectively, of the other bar.

5. A support as set forth in claim 1 further comprising graduations on the front face of the web for locating an electrical box at a desired location lengthwise of the bar.

6. A support as set forth in claim 5 wherein the back wall of said electrical box has a plurality of fastener openings therein for receiving fasteners to be threaded through said pilot holes, said graduations on the front face of the bar being so positioned relative to said pilot holes that when a side wall of the electrical box is aligned with a graduation, at least two pilot holes in the channel bottom are in register with two of said plurality of fastener openings in the back wall of the box.

7. A support as set forth in claim 5 wherein said graduations are at spacings corresponding to fractions of an inch.

8. A support as set forth in claim 5 wherein two sets of graduations are provided, a first set between the channel and one side edge of the bar and another set between the channel and the other side edge of the bar, so that one set of graduations may be conveniently used regardless of which side edge is facing up.

9. A support as set forth in claim 1 further comprising elongate extensions of the bar projecting generally forwardly from said web at opposite ends of the bar and having free outer end portions bent to form 5 fastening flaps extending laterally outwardly away from one another and generally parallel to the web of the bar, said flaps being adapted for engagement with said studs and securement thereto by fastener,.s, each extension having means spaced inwardly from said free outer end portion defining a first fold line extending generally transversely of the extension and means spaced inwardly from said first fold line defining a second fold line extending generally transversely of the extension whereby, if a relatively deep electrical box is to be attached to the bar, the extensions are adapted to be bent at said first fold lines to form said fastening flaps, and if a shallower electrical box is to be attached to the bar, the extensions are adapted to be bent at said second fold lines to form said fastening flaps.

10. A support as set forth in claim 9 wherein said means defining said first fold line comprises slot means in said extension along said first fold line, and said means defining said second fold line comprises slot means along said second fold line.

11. A support as set forth in claim 10 wherein said bar and said extensions are integrally formed.

12. A support bar as set forth in claim 1 wherein the back wall of the electrical box has a plurality of knockouts therein, said web having a width of no greater than about ¾ inches so that the web does not block said knockouts.

13. A support bar as set forth in claim 1 wherein the side walls of the channel are generally parallel, and wherein the pilot holes are located along a common axis extending lengthwise of the support bar.

14. A support as set forth in claim 1 wherein the width of the bottom wall is greater than the diameter of the pilot holes.

15. A support for an electrical box, comprising a bar adapted to be mounted between two spaced-apart wall studs or the like, said bar comprising an elongate web of sheet metal forming a front face of the bar and having side edges extending lengthwise of the bar, a pair of flanges extending generally rearwardly from the side edges of the web, a forwardly-opening channel formed in the web running substantially the full length of the web between the side edges of the web, said channel having spaced apart side walls extending generally rearwardly from the front face of the web, a bottom wall connecting the side walls and forming the bottom of the channel, the side walls of the channel being generally parallel and the bottom wall of the channel being generally planar, and pilot holes spaced along the bottom wall of the channel at relatively closely spaced and regular intervals whereby an electrical box may be attached to the bar in a selected position lengthwise of the bar by placing the back wall of the box flush against the front face of the web over the channel and then fastening the box to the bar by using fasteners threaded through selected pilot holes in the bottom wall of the channel.

16. A support for an electrical box, comprising a bar adapted to be mounted between two spaced-apart wall studs or the like, said bar comprising an elongate web of sheet metal forming a front face of the bar and having side edges extending lengthwise of the bar, a forwardly-opening generally U-shaped channel formed in the web running substantially the full length of the web between the side edges of the web, and elongate extensions of the bar projecting generally forwardly from said web at opposite ends of the bar and having free outer end Portions bent to form fastening flaps extending laterallY outwardly away from one another and generally parallel to the web of the bar, said flaps being adapted for engagement with said studs and securement thereto by fasteners, each extension having means spaced inwardly from said free outer end portion defining a first fold line extending generally transversely of the extension and means spaced inwardly from said first fold line defining a second fold line extending generallY transversely of the extension whereby, if a relatively deep electrical box is to be attached to the bar, the extensions are adapted to be bent at said first fold lines to form said fastening flaps, and if a shallower electrical box is to be attached to the bar, the extensions are adaPted to be bent at said second fold lines to form said fastening flaps, said electrical box being adapted to be attached to the bar in a selected position lengthwise of the bar bY placing the back wall of the box flush against the front face of the web over the channel and then fastening the box to the bar by using fasteners threaded into said channel.

17. A support as set forth in claim 16 wherein said means defining said first fold line comprises slot means in said extension along said first fold line, and said means defining said second fold line comprises slot means along said second fold line.

* * * * *